Aug. 28, 1928.

R. BACCELLIERI

FRUIT CRUSHER

Filed Dec. 8, 1925     3 Sheets-Sheet 1

1,681,920

Witnesses:
Walter Chism
George A. Gross

Inventor
Raffaele Baccellieri
by
Joshua R.H. Potts
his Attorney

Aug. 28, 1928.

R. BACCELLIERI

FRUIT CRUSHER

Filed Dec. 8, 1925    3 Sheets-Sheet 2

1,681,920

Witnesses:
Walter Chum
George A. Gues

Inventor
Raffaele Baccellieri
by Joshua R.H. Potts
his Attorney

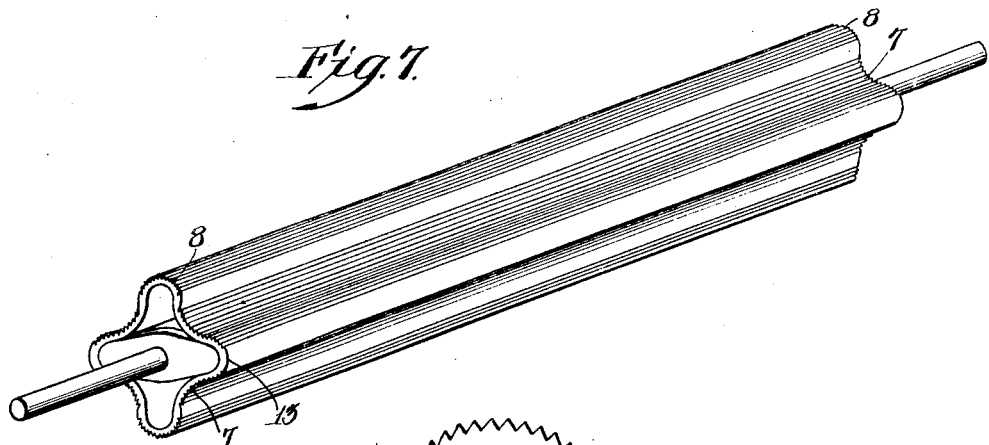
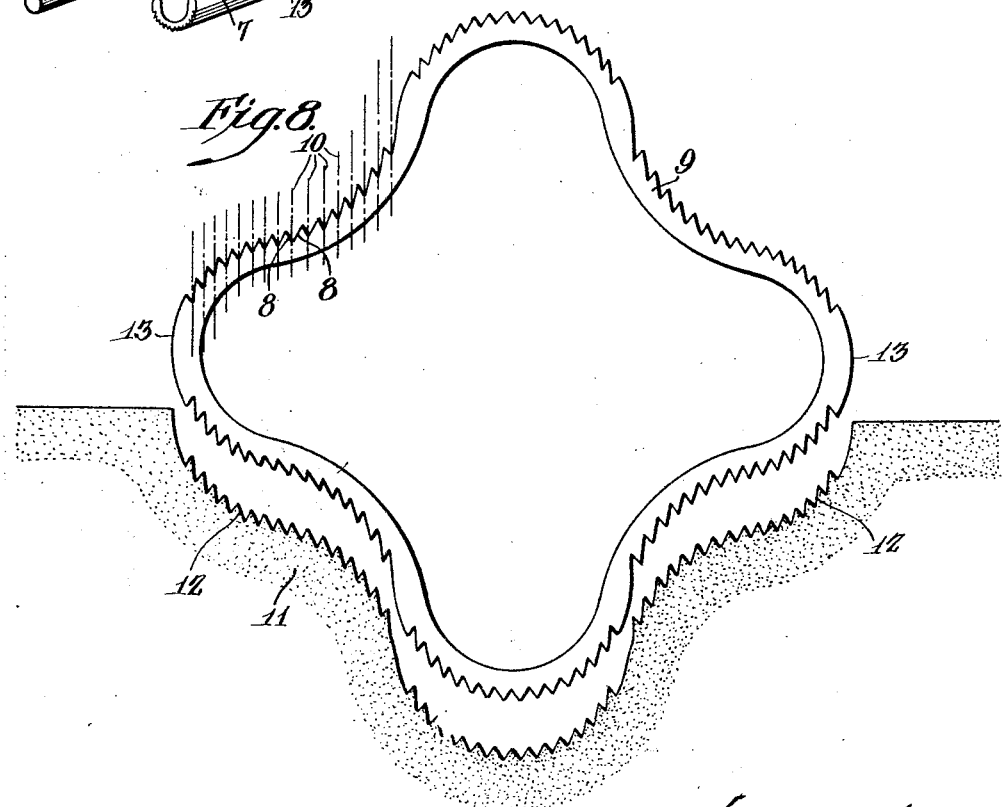

Patented Aug. 28, 1928.

1,681,920

UNITED STATES PATENT OFFICE.

RAFFAELE BACCELLIERI, OF PHILADELPHIA, PENNSYLVANIA.

FRUIT CRUSHER.

Application filed December 8, 1925. Serial No. 73,966.

This invention relates to fruit crushers and more particularly to the crushing rolls.

To meet the demands of users, manufacturers have endeavored to produce a fruit crusher which would grip the fruit, draw it in between the crushing rolls and thoroughly crush the same, and yet be of such design that the crushing rolls could be easily cleaned. As a result of much experimenting, a pair of crushing rolls of lobed cross section were found most satisfactory and have therefore been used for many years. Such rolls were found inefficient in crushing large and especially hard fruit which would slide out from between and over the surface of the crushing rolls. Large hard fruit was usually forced between the rolls by hand which is an inconvenient and unsanitary job.

The object of my invention is to provide crushing rolls which will readily grip and draw in large and hard fruit with practically the same ease as small and soft fruit.

Figure 1:
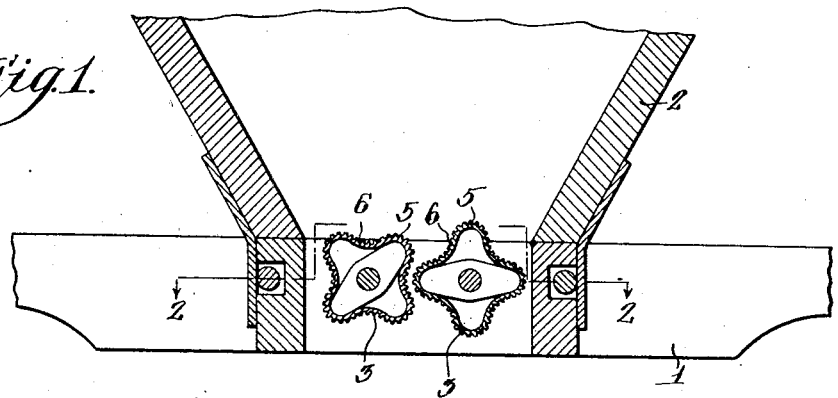
Figure 2:
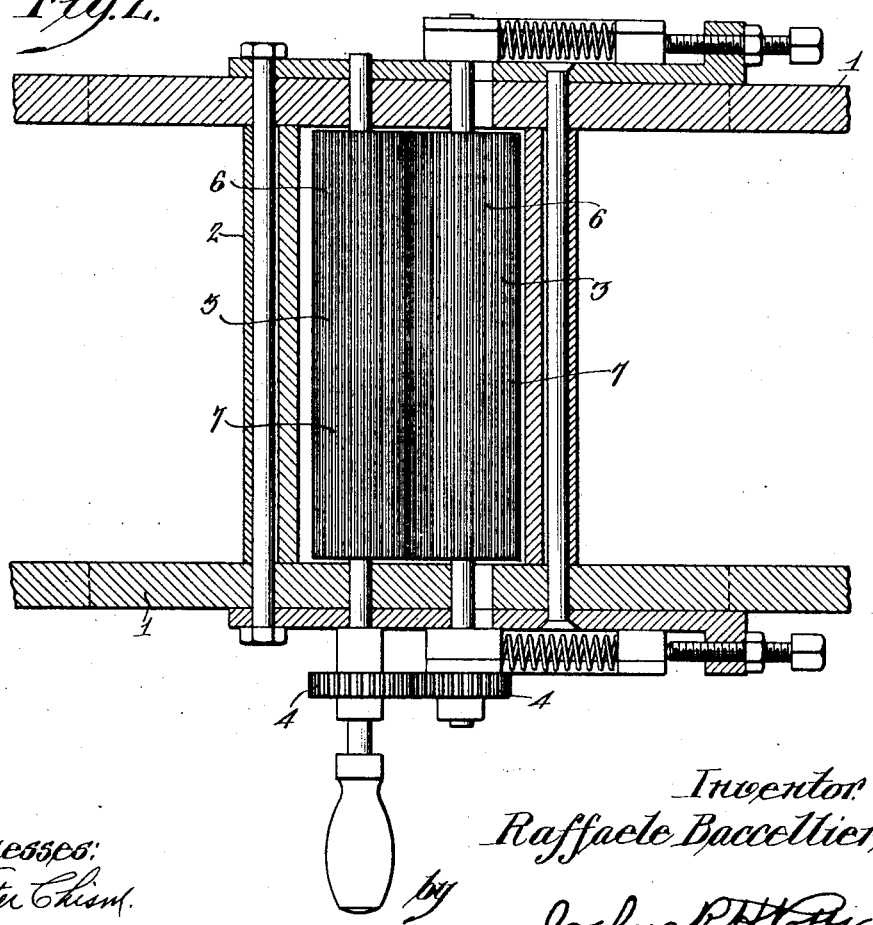
Figure 3:
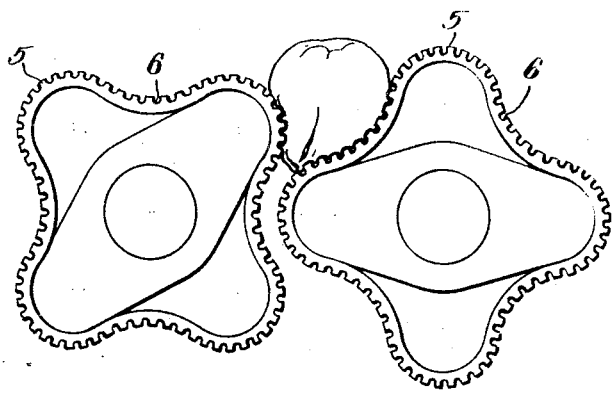
Figure 4:
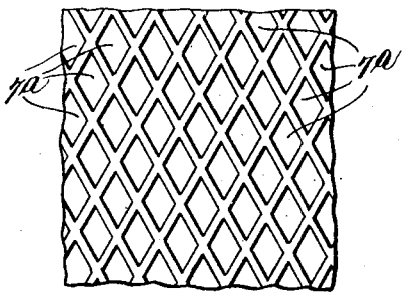
Figure 5:
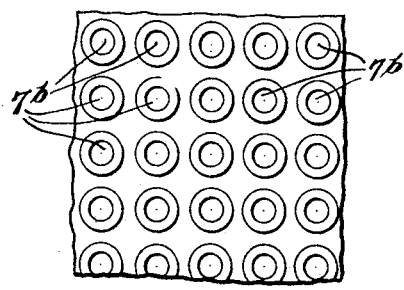
Figure 6:
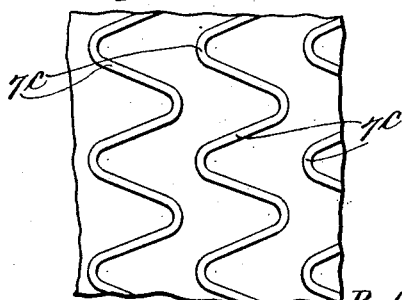

This object, and other advantageous ends which will be described hereinafter, I attain in the following manner, reference being had to the accompanying drawings in which Figure 1 is a fragmentary vertical section through a fruit crusher employing my invention, Figure 2 a section on line 2—2 of Figure 1, Figure 3 an enlarged end view of the crushing rolls made in accordance with my invention showing them in action, Figures 4, 5 and 6 fragmentary face views of different forms of surfaces which may be used for carrying out my invention, Figure 7 a perspective view of a crushing roll showing another form of my invention, and Figure 8 an end view of a pattern of the roll shown in Figure 7, showing it being removed from a sand mold.

Referring to the drawings, 1 indicates the frame of a crusher having a hopper 2, and 3 a pair of crushing rolls bearing in the frame and geared to each other as shown at 4. Each crushing roll is of lobed cross-section having preferably four lobes 5. These rolls are geared to each other so that the lobe of one roll is disposed between the lobes of the other roll and the rolls are of such configuration that uniform space is maintained between the rolls during a complete revolution of the rolls, as shown in Figures 1 and 2. The surface of each roll is provided with cavities 6 which are preferably in the form of longitudinal grooves 7, but may be as shown at $7^a$ in Figure 4, $7^b$ in Figure 5 or $7^c$ in Figure 6. The advantage gained by using grooves instead of the forms shown in Figures 4–6 is that the grooves may be readily cleaned and wiped.

To facilitate making a mold for casting a crushing roll of lobed cross section having the grooves 7 therein, the grooves are made preferably of V-cross section, as shown in Figure 7, so that the opposite side walls 8 of each groove as shown on the pattern 9 in Figure 8, are at the opposite sides of a vertical plane 10 passing through the center of the groove. In other words, serrations are formed by the grooves 7 and the apices of the serrations formed on one-half of the roll point in one direction while those formed on the other half of the roll point in exactly the opposite direction. A pattern with such grooves may be readily pressed into the mold sand 11 and withdrawn without disrupting the groove forming ridges 12 left in the sand.

In use the fruit or other material to be crushed is dumped into hopper 2, and the crusher operated to rotate the crushing rolls 3. The large hard fruit which would ordinarily slide over rolls having a smooth surface will be gripped by the grooved surface of the crushing rolls, drawn in and crushed without the necessity of forcing the fruit between the rolls by hand. This gripping and the consequent drawing in of the fruit between the rolls, is due to the ridges between the grooves cutting into the fruit and obtaining a firm hold thereon as shown in Figure 3. The plain surfaces 13, of the roll shown in Figure 7, at the ends of one pair of opposite lobes 5, and at the opposite sides of the other pair of opposite lobes, have no effect in causing the fruit to slide out from between the crushing rolls.

Fruit crushers having the rolls above set forth, will crush fruit more efficiently because the fruit will not slide over the surface of the rolls. When making the rolls of cast metal the grooves are arranged as shown in Figures 7 and 8 so as to facilitate the making of the mold and thus lower the cost of producing the rolls.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

I claim:—

1. In a fruit crusher, parallel lobular crushing rolls having V-shaped grooves extending longitudinally of their peripheries with the apices of the grooves falling in parallel planes which are tangential to the axis of the roll and the sides of each groove disposed on either side of the plane passing through its apex.

2. In a fruit crusher, a pair of lobular crushing rolls so mounted that the lobes of one roll may enter the depressions of the adjacent roll, and serrations formed on the peripheries of the rolls with the apices of the serrations on one-half of each roll pointing in one direction and the apices of the serrations on the other half pointing in exactly the opposite direction.

3. In a fruit crusher, a pair of lobular crushing rolls so mounted and of such cross-sectional outline that their peripheries are equidistant from one another throughout a complete revolution of both rolls, and serrations formed on the peripheries of the rolls with the apices of the serrations on one-half of each roll pointing in one direction and the apices of the serrations on the other half pointing in exactly the opposite direction.

4. A fruit crusher including a frame and a pair of lobular crushing rolls rotatable therein with the lobes of each roll adapted to successively enter the depressions between the lobes of its companion roll; the rolls having roughened surfaces and being arcuate in cross-section and of such configuration that the shortest radius of each roll is substantially two-thirds of its longest radius and a uniform space is maintained between the peripheries of the rolls throughout a complete revolution of said rolls.

5. A fruit crusher including a frame, a pair of lobular crushing rolls rotatable therein with the lobes of each roll adapted to successively enter the depressions between the lobes of its companion roll, and parallel serrations formed on the periphery of each roll and extending longitudinally thereof; the rolls being arcuate in cross-section and of such configuration that a uniform space is maintained between the peripheries of the rolls throughout a complete revolution of said rolls.

In testimony whereof I have signed my name to this specification.

RAFFAELE BACCELLIERI.